July 3, 1956
J. C. HAMPSON
2,752,956
WIRE FORMING ATTACHMENT FOR CUT-OFF MACHINE
Filed March 28, 1951
5 Sheets-Sheet 1
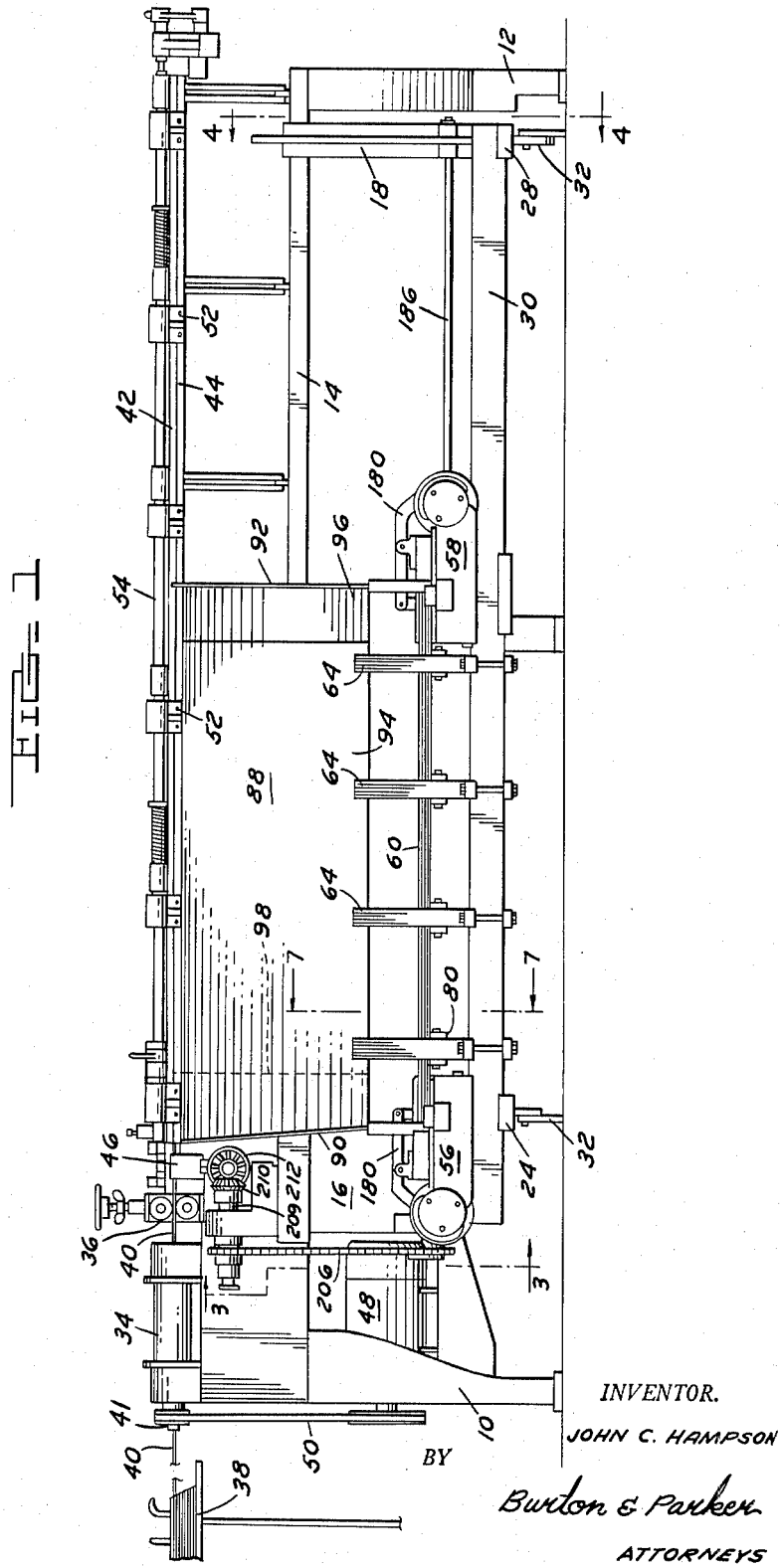
INVENTOR.
JOHN C. HAMPSON
BY
Burton & Parker
ATTORNEYS

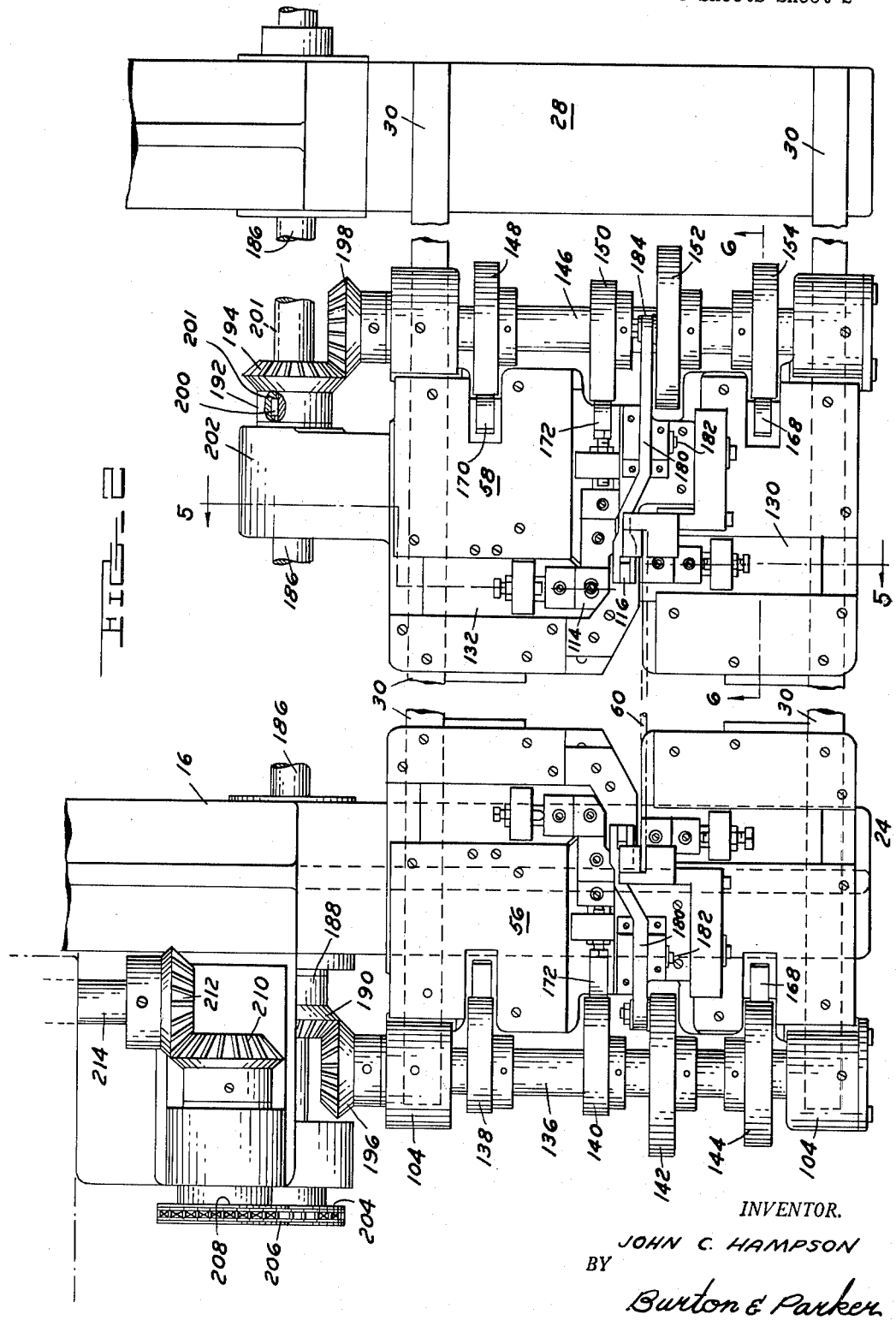

July 3, 1956
J. C. HAMPSON
2,752,956
WIRE FORMING ATTACHMENT FOR CUT-OFF MACHINE
Filed March 28, 1951
5 Sheets-Sheet 3
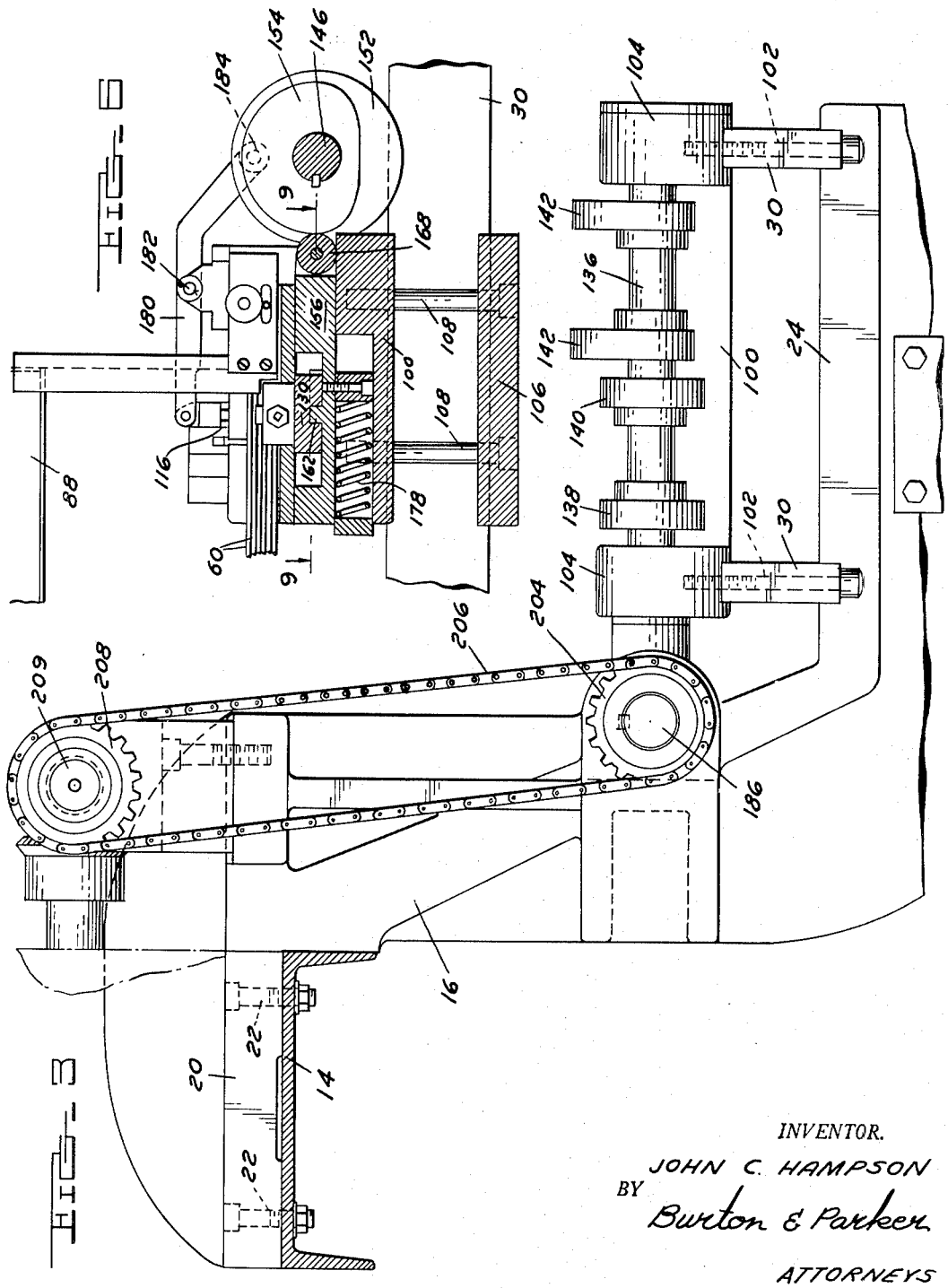
INVENTOR.
JOHN C. HAMPSON
BY
Burton & Parker
ATTORNEYS

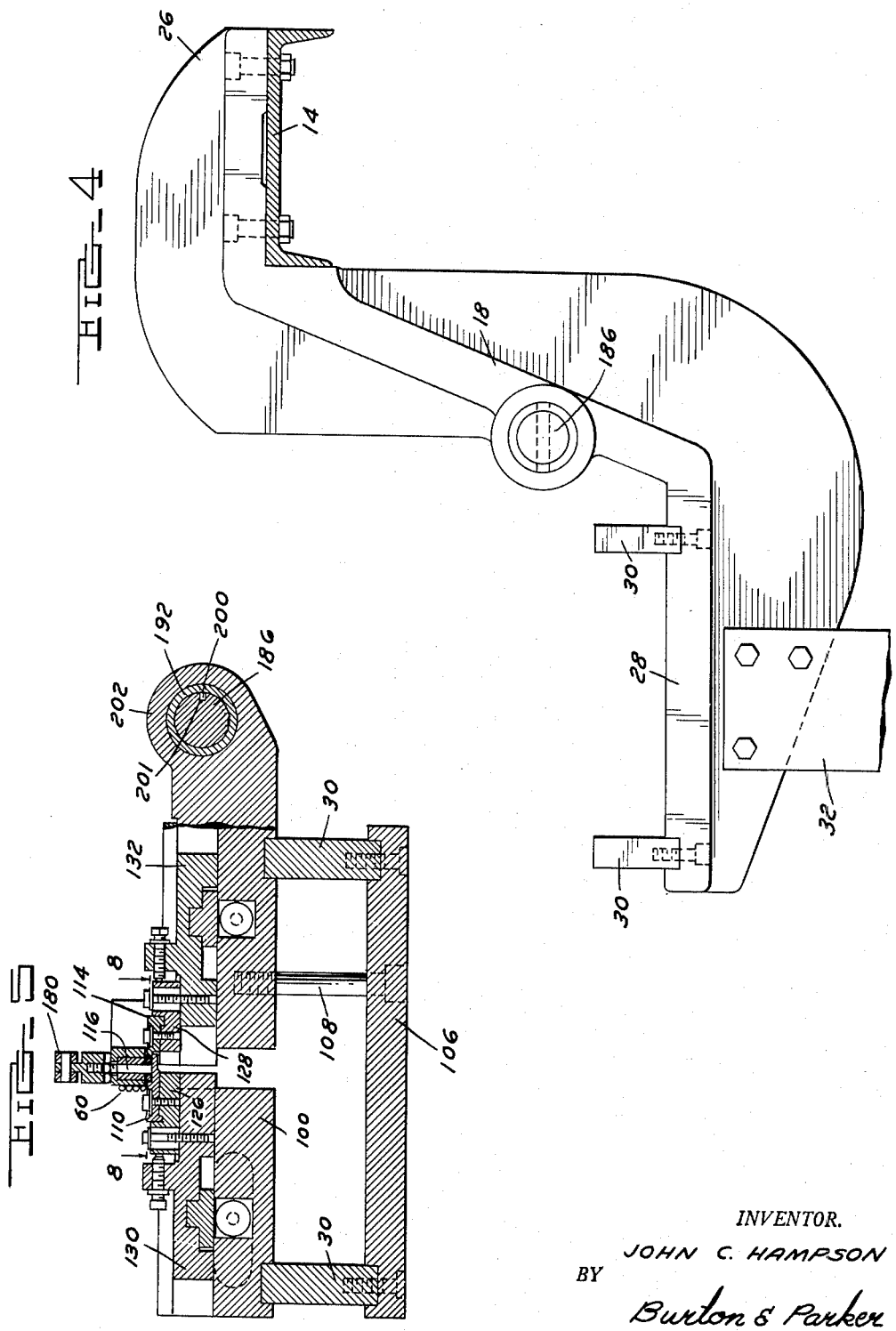

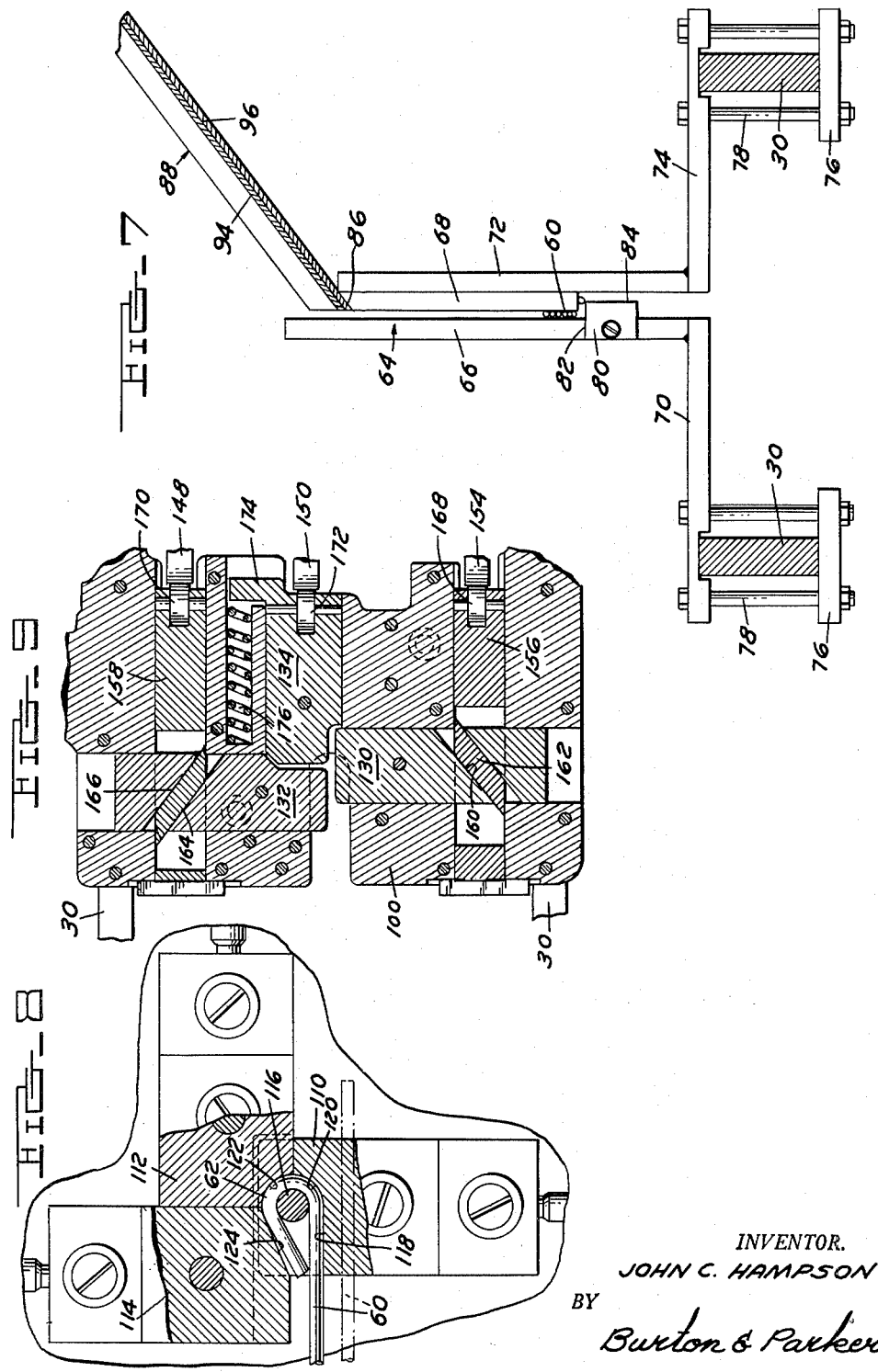

United States Patent Office 2,752,956
Patented July 3, 1956

2,752,956

WIRE FORMING ATTACHMENT FOR CUT-OFF MACHINE

John C. Hampson, Detroit, Mich., assignor, by mesne assignments, to Rockwell Spring and Axle Company, Coraopolis, Pa., a corporation of Pennsylvania Application March 28, 1951, Serial No. 217,969

7 Claims. (Cl. 140—71)

This invention relates to improvements in wire working machines and particularly to improvements in a combination wire straightening and cut-off mechanism and a wire receiving and shaping mechanism.

Heretofore, wire has been fed through wire straightening and cut-off machines and the cut-off wire sections ejected therefrom have been carried to separate machines for the shaping and bending thereof. These machines were entirely separate from one another and usually placed at spaced locations in a plant, necessitating the use of handling devices and labor to transfer the cut-off wire sections from one machine to the other.

An important object of the invention is to reduce time and labor and to conserve space in the fabrication of wire products. Another important object of the invention is to combine in one machine a wire straightening and cut-off mechanism and a wire shaping and bending mechanism, the latter being arranged to automatically receive the sections of wire ejected by the first mechanism and function without supervision to shape the wire sections to desired configurations. A further important object of the invention is to provide an attachment for a wire straightening and cut-off machine which is so arranged and designed to receive the cut sections of wire ejected thereby and automatically shape the wire section to the desired configuration. A still further important object of the invention is to provide novel means for adjusting the shaping mechanism to accommodate it to various lengths of cut wire sections and additional novel means for feeding the ejected cut wire to the shaping mechanism and properly positioning the same for the operations performed thereon by the shaping mechanism.

An important feature of the invention relates to the provision of novel delivery means for conveying the ejected cut sections of wire from the wire straightening and cut-off mechanism to the wire shaping mechanism and for feeding and properly positioning the wire sections for operation thereon by the shaping mechanism. Another important feature of the invention relates to the operation of the wire shaping mechanism and the division thereof into two separate operating units each driven from the same source of power employed for operating the wire straightening and cut-off mechanism and yet providing adjustment of one unit with respect to the other without deranging or interrupting the drive connection between the units and the source of power. A further important feature of the invention is the wire feed means between the wire straightening and cut-off mechanism and the wire shaping mechanism and particularly the provision of an inclined trough or chute for conveying the cut sections of wire from the first mechanism to the second mechanism which is constructed in a novel manner to guide the wire sections to the proper position in the shaping mechanism and to be conveniently adjusted to accommodate cut sections of wire of different lengths.

Various other objects, advantages and meritorious features of the invention will become more fully apparent from the following specifications, appended claims and accompanying drawings, wherein:

Fig. 1 is a side elevation of the machine showing the respective location of the mechanism for straightening, advancing and cutting off sections of wire and the mechanism for receiving the cut off sections of wire and shaping or bending same in the desired formation, Fig. 2 is a top view of the mechanism for receiving the cut sections of wire and bending same into the desired formation, Fig. 3 is a vertical cross sectional view of the machine taken along line 3—3 of Fig. 1 and showing the driving means for operating the wire bending mechanism, Fig. 4 is a vertical cross sectional view of the frame for supporting the rails of the wire bending mechanism taken along line 4—4 of Fig. 1, Fig. 5 is a fragmentary vertical sectional view of one of the wire bending devices taken along line 5—5 of Fig. 2, Fig. 6 is a fragmentary vertical sectional view through one of the wire bending devices taken along line 6—6 of Fig. 2, Fig. 7 is a vertical sectional view illustrating the transfer chute and storage magazine for the cut sections of wire and taken along line 7—7 of Fig. 1, Fig. 8 is a horizontal fragmentary sectional view taken along line 8—8 of Fig. 5 and illustrating an assembly of jaws for bending the cut sections of wire, and Fig. 9 is a fragmentary horizontal sectional view taken along line 9—9 of Fig. 6 illustrating the slide mechanism for operating the jaws of the wire bending mechanism.

In general, the device comprises a unitary assembly operating portion mounted on a single frame supported from the floor or other suitable base. Referring particularly to Fig. 1, the machine in general comprises a supporting frame unit comprising floor engaging end members 10 and 12 and connecting elongated longitudinal frame members upon which the operating portion of the machine is located. One elongated longitudinal supporting frame member or platform is indicated at 14 and as shown in Fig. 1 it is located in elevated position with respect to the floor. This frame member supports a conventional wire straightening, advancing and cut-off mechanism which is adapted to receive wire from a wire uncoiling reel disposed to the left of the machine in Fig. 1 and continuously advances the wire a given length of the machine and cutting off sections of equal length thereon.

Attached to the machine is a subsidiary frame work comprising two end supporting members 16 and 18 which, as shown respectively in Figs. 3 and 4, are attached to the supporting member or platform 14 and extend downwardly and laterally therefrom. The upper end section 20 of the end frame member 16 overlies the supporting member or platform 14 and is bolted thereto such as by bolts 22—22. The frame 16 extends downwardly from its connection to the platform 14 and is provided with an outwardly projecting horizontal end section 24 disposed below and to one side of the platform 14. Similarly, the subsidiary supporting frame member 18 is provided with an end section 26 which overlies the platform 14 and is bolted thereto as shown in Fig. 4. The frame member 18 extends downwardly from its connection to the platform and is provided with a laterally projecting horizontal extending end section 28 which is located below the level of the platform 14 and in alignment with the lower end section 24 of the frame member 16. Supported upon the lower end sections 24 and 28 of the subsidiary frame members 16 and 18 are a pair of rails 30—30 which run substantially the full length of the machine as shown in Fig. 1. These rails extend parallel to one another in horizontally spaced apart relationship and are bolted or otherwise rigidly secured to the subsidiary end frame members 16 and 18 in the manner shown in Fig. 4. Each end frame member 16 and 18 may be further supported from the floor by means of similarly formed legs 32 shown in Fig. 1 and in Fig. 4.

The wire straightening, advancing and cutting mechanism supported on the platform 14 is of conventional construction and includes a wire conditioning and straightening unit 34 mounted at the left end of the machine as viewed in Fig. 1 and one or more sets of opposed rollers 36—36 which engage the wire and advance the same axially and longitudinally of the machine toward the right end thereof as viewed in Fig. 1. A standard form of wire uncoiling apparatus is shown at 38 at the left of the machine in Fig. 1 and from this apparatus a length of wire 40 is conveyed through a conduit 41 into the wire straightening unit 34 and thence between the wire advancing rollers 36—36. After passing through the rollers 36—36, the wire 40 is advanced longitudinally along the machine between two superimposed bars 42 and 44 for a predetermined length along the machine. The wire 40 may be advanced as far as the right end of the machine as viewed in Fig. 1 or to any intermediate position between the cut-off device and the right end of the machine.

Adjacent to the wire advancing rollers 36—36 is a wire cut-off device indicated generally at 46 which operates at periodic intervals to cut off the sections of wire of a predetermined length. The wire cut-off mechanism is of conventional design and is driven together with the rollers 36—36 and the wire straightening device 34 from a source of power such as an electric motor 48 supported under the forward end of the machine. Suitable driving means such as an endless belt 50 connects the motor with the moving parts of the wire straightening, advancing and cutting off mechanism.

As previously described, the wire is advanced between the two vertically disposed bars 42 and 44 which run substantially the length of the machine. Normally, these bars hold the wire therebetween and keep the same from falling thereout. The lower bar 44 is movable laterally with respect to the upper bar 42 to permit the cut sections of wire to drop away therefrom. For this purpose, the lower bar is provided with hangers 52 disposed at longitudinally spaced points along the length of the machine. The hangers extend upwardly past the upper bar 42 and are fixed to a rock shaft 54 running substantially the length of the machine on a level above the upper bar 42. The rock shaft 54 when rotated is capable of rocking the lower bar 44 to a laterally offset position with respect to the upper bar 42 to permit a cut section of wire therebetween to fall away. The rock shaft 54 is operatively coupled to the cut-off device 46 so that it is rotated only when the cut-off device is operated. Otherwise, the two bars 42 and 44 are disposed in superimposed relationship to hold the wire therebetween.

Supported on the rails 30—30 is a wire forming or bending mechanism. This mechanism in the illustrated embodiment of the invention comprises two units indicated generally at 56 and 58. One of these units, such as the one indicated by reference character 56, is fixed to the rails 30—30 adjacent to the forward end of the machine. The other unit 58 is capable of slidable movement to and fro on the rails 30—30 toward and away from the fixed unit 56. This slidable adjustment enables the two units of the wire feeding mechanism to take wire sections of different lengths and simultaneously bend or otherwise shape the wire sections into the desired formation.

The two wire shaping units 56 and 58 may be differently constructed from that illustrated in the drawings and described hereinafter or may contain wire engaging operating elements differently shaped from that shown and described for bending the wire in another form. The two units herein illustrated are constructed similar to one another and are arranged to impart the same kind of bend in each end of the wire sections received thereby. Fig. 8 illustrates the result obtained by the use of the two wire shaping units illustrated herein. A straight length of wire 60 is moved from its dotted position to its full line position by synchronous operation of the two units 56 and 58 and each end of the wire is acted upon by one of the units to bend the wire upon itself to form the loop or eye 62.

Interposed between the two units 56 and 58 and supported on the rails 30—30 of the machine is a receiver or magazine for containing cut sections of wire 60 ejected from the wire straightening and cut-off mechanism previously described. This magazine receives the cut wire sections in their ejected order and is designed to hold a fair supply of these wire sections and to feed them properly to the two units 56 and 58. The magazine comprises a plurality of similar upright structures generally indicated at 64 and supported in longitudinally spaced apart relation to one another on the rails between the two units. Each structure 64 comprises an outer vertical member or bar 66 and an inner vertical member or bar 68, the two being arranged in the same plane extending crosswise of the machine and in slightly spaced apart parallel relation as shown in Fig. 7. The space or stacking slot between the two bars is sufficient to receive the severed wire sections and stack them one upon another in a single row as is also shown in Fig. 7. The outer bar 66 is secured at its lower end to an outwardly extending leg 70, the two together forming an L-shape configuration. The inner bar 68 is secured to a vertical supporting member or bar 72 located immediately rearwardly thereof. The lower end of the supporting bar 72 is secured to an inwardly extending horizontal leg 74, the two together exhibiting an L-shape configuration. The extremities of the two legs 70 and 74 overlie the two rails 30—30 and are adjustably clamped thereto by similar provisions including, for each leg, a base plate 76 engaging the underside of the rail over which the leg extends and bolt and nut assemblies 78 for clampingly drawing the leg and plate against the top and bottom sides of the rail. The clamping pressure of the base plates 76 may be released to permit slidable movement of the structures 64 along the rails to different positions.

The inner bar 68 of each magazine structure 64 is of shorter length than the outer bar 66 and as shown in Fig. 7 it is supported so that its upper end terminates below the upper end of the outer bar and its lower end terminates above the lower end of the outer bar. Secured to either one or both sides of the outer bar 66 is a rectangularly shaped plate 80. This plates serves as a bottom wall, floor, or sill for the magazine. As shown in Fig. 1, two spaced plates 80—80 are provided on the opposite sides of the outer bar 66. These plates are positioned as shown in Fig. 7 so that their upper horizontal edges 82 are spaced slightly below the lower end of the inner bar 68, the distance therebetween being just sufficient to permit one of the cut wire sections 60 to pass therethrough. The space between the upper edge of the floor 80 and the lower end of the member, or wall 68, may be termed a supporting slot. The inner vertical edge 82 of the two plates 80—80 associated with each structure 64 terminates short of the plane of the supporting bar 72 as indicated in Fig. 7 to form a narrow passage opening out through the bottom of the structure. This passage or discharge slot serves as the means for ejecting the wire sections after the forming operation by the units 56 and 58 and permits the sections to fall either to the floor or into a receptacle placed under the structures for receiving the same.

The upper end of the inner bar 68 of each structure 64 of the magazine is cut away as indicated at 86 to form an upwardly and rearwardly inclined edge. Resting on this inclined edge is the bottom marginal portion of an inclined trough or chute generally indicated at 88 and extending upwardly and rearwardly from the structure 64 to bring its upper margin below the lower horizontal bar 44 of the wire cut-off mechanism as illustrated in Fig. 1. The upper marginal portion of the chute 88 extends under the guide bars 42 and 44 of the cut-off mechanism and is so supported in this position that the wire sections ejected from the cut-off mechanism fall into the chute and gravitate downwardly to the magazine.

The chute 88 is wide enough as shown in Fig. 1 to receive the cut-off sections of wire ejected from between the superimposing bars 42 and 44 of the cut-off mechanism and guide them downwardly to the vertical space or slot between the inner and outer bars 66 and 68 of the magazine. Each opposite side edge of the chute 88 is provided with a vertical wall, one of which is indicated at 90 at the left end of the chute in Fig. 1 and the other is indicated at 92 at the right end thereof. These side walls cooperate to retain the cut sections of wire upon the inclined surface of the chute. Preferably the side walls 90 and 92 are arranged in slightly converging relationship as shown in Fig. 1. One of the side walls, such as the one designated by reference character 90, is so disposed at an angle that it converges slightly toward the other wall 92 as it approaches the magazine structure 64. The lower ends of the two side walls 90 and 92 are normally separated a distance equal to the cut sections of wire and it is evident that the two side walls cooperate in this fashion to guide the cut wire sections into the magazine so that the wire sections are stacked therein in vertical registration one above the other.

An important feature of the invention is the provision for providing adjustment of the inclined trough or chute 88 to accommodate cut sections of wire of different lengths. As shown in the illustrated embodiment of the invention the chute 88 is actually composed of two superimposing metallic sheets, the upper one of which is indicated at 94 and the lower one of which is indicated at 96. The upper sheet 94 is fixed to the machine and is thereby held stationary. The lower sheet 96 of the chute is slidable longitudinally relative to the upper sheet in order to vary the width of the chute. As shown in Fig. 1 the left edge of the lower sheet 96 is indicated in dotted outline at 98. It is evident that the lower sheet 96 is capable of being moved to the right in Fig. 1 to substantially the full length of the machine and will carry its side wall 92 therewith. In this manner, the chute 88 is capable of contraction and expansion to accommodate cut wire sections of different lengths and, regardless of the selected length, to guide the wire sections to the magazine for stacking in vertical alignment therein. It is thus apparent from the previous description that both the wire forming unit 58 and the lower section 96 of the trough can be adjusted toward the right end of the machine from the position shown in Fig. 1 to increase the width of the trough 88 and the space between the two wire shaping units 56 and 58 for receiving and working on cut wire sections of increased length. When such an adjustment occurs the magazine structures 64 may be shifted laterally further apart or additional structures of this kind may be mounted on the rails.

The operating parts of the two wire shaping units 56 and 58 are well known to those skilled in the art. In the illustrated embodiment of the invention these devices are like one another and are arranged to similarly shape the opposite ends of a wire 60 received therebetween. In general, and with reference to Figs. 2, 5, 6, 8 and 9, each unit 56 or 58 comprises a main body portion 100 resting upon the upper edges of the rails 30—30. As shown in Fig. 3, the unit 56 may be stationarily held to the rails by means of bolts 102—102 which rise upwardly through the rails and enter the journal blocks 104—104 carried on the body 100. The unit 58 is releasably clamped to the rails, as shown in Figs. 5 and 6, by means of a plate 106 underlying the rails and drawn into clamping engagement therewith by means of bolts 108.

As previously mentioned, the two units 56 and 58 are similar and their operating elements are arranged and moved in the same manner to impart a similar bend in each end of the wire section. A description of one will suffice for the other. Referring to Fig. 8, each unit comprises three forming members or slides indicated at 110, 112 and 114. These members are arranged on three sides of an arbor 116 of the cylindrical formation shown and are guided for straight line reciprocating movement toward and away from the arbor. The inner ends of the members are shaped to successively engage the adjacent end of a wire section 60 and progressively bend the end of the wire into the loop around the arbor. The inner ends of each slide member is shaped to engage the wire and impart a bend to the section of the wire engaged thereby. As shown in Fig. 8, and also in Fig. 5, the upper face of the inner end of the slide member 110 is reduced or cut away to provide a wire engaging wall 118 ending in a curved portion 120 whose center is coincident with the axis of the arbor. The inner end of the slide member 112 is shaped to ride over the cut away portion of the first member 110 and is provided with a curved wire engaging wall portion 122 which continues the curvature of the wall portion 120 of the slide member 110. The inner end of the third slide member 114 is shaped to override the cut away portion of the first member 110 and is provided with an inclined face 124 for engaging the extremity of each wire section.

Fig. 8 shows the slide members 110, 112 and 114 at the completion of a wire bending operation. In their initial starting position for each operation they are spaced away from the arbor 116. The slide members move progressively toward the arbor, the slide member 110 first picking up a wire section 60 at its dotted position in Fig. 8 and bodily moving it against the arbor to the full line shown. In this position the wire section is positioned at the upper end of the ejection passage formed between the inner edges 84 of the plates 80 and the supporting upright members 72 of the magazine structures. It is retained from falling therethrough by the underlying portion of the slide member as shown in Figs. 5 and 8. Continued inward movement of slide 110 causes its curved wall 120 to impart an initial bend in the wire. The second slide 112, timing its movement slightly behind the first slide, engages the initially bent end of the wire section and its curved wall 122 further wraps it around the arbor. The third slide 114 then follows behind the second slide and its inclined face engages the extremity of the partially formed loop and forces it to the position shown in Fig. 8 thus completing the loop 62.

The slides of each wire bending unit are separately supported upon and rigidly connected to blocks which in turn are adjustably mounted on cam driven members operatively connected to continuously rotating cam elements. As shown in Fig. 5 the two opposing slide members 110 and 114 are bolted or otherwise secured to blocks 126 and 128 respectively. The two blocks 126 and 128 are in turn adjustably mounted upon cam driven members 130 and 132 respectively. The middle slide member 112 is similarly mounted upon a block which in turn is adjustably mounted on a cam driven member 134. The three cam driven members are located below their respective slides and in the final act of forming a loop they assume the position shown in Fig. 9. The three members 130, 132 and 134 are guided in the body 100 for straight-line reciprocating motion.

Each wire bending unit 56 and 58 is provided with a similar set of rotary cams for operating the forming slides through their respective cam driven members 130, 132 and 134. As shown in Fig. 2, the unit 56 is provided with a transversely extending shaft 136 containing a set of four axially spaced apart cam wheels 138, 140, 142 and 144. Similarly, the unit 58 is provided with a transversely extending shaft 146 containing a set of four axially spaced apart rotary cams 148, 150, 152 and 154. The slide control members 130, 132, and 134 of each unit are driven from the rotary cams and reciprocate back and forth for each complete revolution of the shaft upon which the cams are mounted.

Referring to wire bending unit 58, and the same applies to the other unit 56, the two opposing slide control members 130 and 132 reciprocate in paths parallel to the cam shaft 146. To drive each of these members from the shaft, there is provided an intermediate reciprocating member extending to one of the cams on the shaft and movable crosswise to the direction of travel of the slide control member. Referring to Fig. 9, the intermediate drive member for the slide control member 130 is indicated at 156; the intermediate drive member for the slide control member 132 is indicated at 158. The outer ends of the two drive members underlie their respective slide control members and are coupled thereto to convert their reciprocating movement to the slide control members. For this purpose, slide control member 130 is provided with a downwardly opening inclined slot 160 into which an upwardly extending integral part 162 of the drive member 156 slidingly fits. Similarly, the slide control member 132 is provided with a downwardly opening slot 164 into which an integral part 166 of the drive member 158 slidingly fits. The camming reaction between the parts 162 and 166 and the side walls of the slots into which they respectively project angularly converts the motion of the drive members to actuate the slide control members in paths of movement perpendicularly related thereto.

The inner ends of the intermediate drive members 156 and 158 and the control member 134 for the middle slide 112 are each provided with a roller which is carried therewith as the member moves. The rollers for the members 156, 158 and 134 are indicated respectively at 168, 170 and 172, and as shown in Fig. 9, and also in Fig. 6, these rollers project rearwardly from their respective members for engagement by certain of the rotary cams on the shaft 146. As shown in Figs. 6 and 9, the rollers 168, 170 and 172 bear on the peripheries of the rotary cams 154, 148 and 150 respectively. The rollers are maintained in constant engagement with the peripheries of their respective cams by spring means. As illustrated in Fig. 9, the control member 134 for the middle wire bending slide is provided with a lateral projection 174 which forms a seat for one end of a coiled spring 176. A coiled spring 178 is shown in Fig. 6 for yieldingly urging the roller 168 into continuous engagement with the periphery of the cam 154. A similar spring provision (not shown) similarly yieldingly urges the roller 170 into engagement with the cam 148. The cams 148, 152 and 154 are so shaped and angularly related that they will drive the wire bending slide members 110, 112 and 114 in the time sequence previously described for forming the loop 62 in one end of a wire section. It is understood that the stationary wire bending unit 56 is similarly constructed and operated for forming the loop in the opposite end of the wire section.

The arbor 116 of each unit 56 and 58 is arranged to be moved upwardly at the completion of the loop 62 in order to free the wire section for ejection from the two units. The upward movement of the arbor is controlled in timed sequence of retraction of the wire forming slide slot members 110, 112 and 114. The upper end of each arbor 116 is pivotally connected to the outer end of a rocking arm 180, as shown in Figs. 5 and 6. The arm in each unit is pivotally supported intermediate its ends at 182. The opposite or inner end section of the arm is bent downwardly and carries a roller 184. The roller is received in a cam track formed on one side of the rotary cam 152 and the cam track has such a configuration that it will rock the arm in the direction to lift the arbor when the wire forming slide members are retracted. A similar rocking arm and operating means therefor is provided at the stationary unit 56.

Extending longitudinally of the machine and preferably the full length thereof, as shown in Fig. 1, is a rotating drive shaft 186. The drive shaft is carried by the frame work of the machine on approximately the level of the wire shaping units 56 and 58. The end of the drive shaft 186 opposite to the stationary unit 56 is provided with a hub 188 carrying a beveled gear 190. The hub and beveled gear are fixed to the shaft for joint rotation therewith. Carried on the shaft 186 opposite to the movable unit 58 is a similar hub 192 and beveled gear 194. As will be described, the hub 192 and its beveled gear 194 are keyed to the shaft 186 for joint rotation therewith but are capable of longitudinal movement therealong. The beveled gear 190 at the forward end of the shaft 186 engages the beveled gear 196 at the inner end of the cam shaft 136 for the unit 56. Similarly, the beveled gear 194 opposite to the movable unit 58 engages the beveled gear 198 carried on the inner end of the cam shaft 146. It is evident from the description thus far that rotation of the drive shaft 186 will cause rotation of the two cam shafts 136 and 146 and their respective cam elements for driving the operating parts of the two units 56 and 58.

The hub 192 associated with the movable unit 58 is provided with a key 200 as shown in Fig. 5 for coupling the hub and its beveled gear 194 to the drive shaft 186. The slot within which the key 200 projects may extend approximately the full length of the drive shaft in order to permit the movable unit 58 to travel from a position close to the stationary unit 56 to the opposite end of the machine. The movable unit 58 is provided with a laterally projecting portion or trunnion cradle 202 which embraces the hub 192, as shown in Fig. 5. The hub is coupled to the cradle in any suitable manner for joint longitudinal movement therewith around the shaft 186. It is thus apparent that in whatever position the movable unit 58 is adjusted, its moving parts will be driven from the shaft 186.

The shaft 186 for driving the operating parts of the two units 56 and 58 is coupled to the moving parts of the cut-off mechanism and times the operation of the moving parts with the operation of the cut-off mechanism. As shown in Fig. 3, the extreme forward extremity of the drive shaft 186 is provided with a gear wheel 204 around which extends the lower portion of an endless sprocket chain 206. The upper portion of the sprocket chain is looped around a gear wheel 208 and fixed to a short horizontal extending shaft 209. The shaft 209 carries a beveled gear 210 engaging a second beveled gear 212 disposed below the wire cut-off device 46. The beveled gear 212 is fixed to the outer end of a shaft 214 for forming the drive shaft for the cut-off device 46. It is evident that the wire forming units 56 and 58 receive their driving impuses from the moving parts of the cut-off mechanism and that such operative connection will actuate the wire forming slide members of the two units regardless of the spacial adjustment of one with respect to the other.

The wires stacked in the magazine as hereinabove described are supported therein by the bottom wire of the stack resting upon the upper face of the rectangularly shaped plate 80 shown in Fig. 5. When the bottom wire is picked up by the forming members 110 of each bending unit, the wire is carried laterally from the dotted line position of Fig. 8 to the solid line position. This lateral movement of the wire carries it from beneath the superincumbent stack of wires, across the upper face of the plate 80 and to a position such that when the forming members 110, 112 and 114 are withdrawn and the arbor 116 is raised, the wire section drops vertically through the space between the plate 80 and the opposite wall 72 of the magazine, and thence to the floor or into a receptacle placed therebeneath.

What I claim is:

1. A wire bending machine comprising: a pair of spaced apart wire bending units each including a movable wire shaping die and an arbor with which the die cooperates to bend a wire; a wire supporting magazine disposed between the units and provided with a horizontally extending wire supporting floor disposed with respect to the dies to position the wire resting on the floor in alignment with the path of travel of the dies; said magazine provided with upright spaced apart side walls one of which terminates spaced above the floor a distance just exceeding the thickness of a wire adapted to be shaped by the dies; the upper face of said floor lying in the plane of the movement of the dies such that a wire disposed within the magazine and lying on the floor will be carried out of the magazine upon movement of the dies and against the arbor to shape the wire.

2. In a wire bending machine: a pair of upright spaced apart guide bars defining between their opposed edges an upper wire section stacking slot and a laterally offset wire section discharge slot with the two slots connected by a horizontally extending wire supporting slot; the opposed edges of the bars defining the stacking and supporting slots being spaced apart a distance just sufficient to pass a single wire section therebetween; a pair of cooperable wire bending dies exhibiting wire shaping faces, an arbor cooperable with the wire shaping faces of the dies to bend a wire therebetween received in the supporting slot, one of said dies supported for movement such that its shaping face sweeps the plane of the supporting slot in a direction to carry a wire section disposed at the bottom of the stacking slot and resting in the wire supporting slot through the supporting slot toward the discharge slot and into wire shaping engagement with the arbor for shaping of the wire between the arbor and dies.

3. A wire bending machine comprising: a pair of spaced apart wire bending units; a pair of wire shaping dies and an arbor supported on each unit for movement toward and away from each other with each die exhibiting wire shaping faces cooperable to bend a wire therebetween and around the arbor; mechanism mounted on each unit and coupled with each die and with the arbor to actuate the same; power means including a rotatable shaft extending between the units and coupled in driving engagement with the mechanism of each unit; a wire dispensing magazine disposed between the units in wire feeding relation thereto and exhibiting a pair of opposed spaced apart upright guide bars, said bars shaped along their opposed edges to exhibit a downwardly extending wire stacking slot and a laterally offset downwardly extending discharge slot communicatingly connected together by a horizontal wire supporting slot; the opposed edges of said bars defining the stacking slot and the supporting slot being spaced apart a distance to receive slidably a wire section therebetween; said supporting slot lying in the plane of movement of the wire shaping faces of one of the dies of each unit such that a wire disposed in the magazine and lying in the bottom of the stacking slot will be engaged by the wire shaping faces of such dies and carried laterally through the supporting slot and against the wire shaping faces of the other dies, said dies when disposed in the wire shaping position having their wire shaping faces aligned with the discharge slot such that a wire being shaped between the faces will fall through the discharge slot upon retraction of the dies from the wire.

4. A wire bending machine comprising: a pair of spaced apart wire bending units each exhibiting a pair of cooperable wire shaping dies and an arbor; mechanism coupling the units together for synchronous operation; an upright wire dispensing magazine disposed intermediate the units and opening upwardly at the top between a pair of opposed side portions and downwardly at the bottom over a floor portion and under the lower edge of one of the side portions with the floor portion terminating beneath the said one side portion; one of the dies of each unit being supported for reciprocable movement in the plane of the floor portion and operable in one direction of reciprocation to urge the bottom wire of a stack of wires in the magazine across the floor portion and under the edge of said one side portion and into wire shaping engagement with the other die and the arbor; the other die of each unit being supported for movement to a wire shaping position in alignment with the edge of the floor portion beneath said one side portion; the dies when disposed in the wire shaping position adapted to support a wire being shaped outwardly offset the edge of said floor portion such that upon retraction of the dies the wire will fall downwardly away from the magazine.

5. In a wire bending machine; a wire bending unit having a die supporting plate; one surface of the plate exhibiting a pair of perpendicularly disposed die receiving guideways; a movable die supported in each guideway for relative perpendicular movement; a cam shaft mounted on the plate exhibiting a pair of cams for revolution about an axis perpendicular to the movement of one of the dies and parallel to the movement of the other die; the second mentioned die having a flat body portion one face of which is cut away to define a diagonally extending groove; a cam follower for each cam with one of the followers coupled with the first mentioned die and with a cam to reciprocate the die; the other follower slidably supported on the plate for perpendicular movement over the diagonal groove in the body of the second mentioned die and coupled at one end with the other cam; the other end of the second mentioned follower exhibiting a part diagonally disposed on the follower and slidably receivable within said groove and operable as the follower reciprocates to urge the die in complementary perpendicular movement toward and away from the first mentioned die.

6. A wire bending machine comprising: a wire section dispensing magazine including downwardly extending opposed wire guide portions spaced apart a distance to pass one wire section therebetween and a bottom wall portion extending away from one of the guide portions and beneath the lower end of the other guide portion spaced therefrom a distance sufficient to pass one wire section thereunder; a pair of cooperable wire shaping elements, one of said elements comprising an arbor, the other of said elements comprising a die, one of said elements supported for movement in the plane of a wire disposed on the bottom wall portion of the magazine and operable to engage a wire disposed on the bottom wall and carry it beneath said other guide and against the other element to shape the wire between the elements.

7. A wire bending machine comprising: a frame; a pair of spaced apart wire bending units mounted on and secured to the frame; means releasably securing one of the units to the frame for movement toward and away from the other unit; a wire feeding magazine disposed intermediate the units to feed opposite ends of successive wire to the units, with said one unit being movable toward and away from the other unit to accommodate wires of various lenghts; power mechanism including a rotatable shaft extending between the units to drive the units in timed relation; said shaft linearly recessed parallel to the axis thereof to exhibit an elongate slot; a bevelled gear slidably received upon said shaft and provided with a part receivable within the slot; means mounted on the gear and engageable with the shaft to adjustably position the gear thereon at determined positions linearly therealong; each unit provided with wire bending mechanism including a shaft and bevelled gear operatively connected to the first mentioned gear to be driven upon rotation of the first mentioned shaft; and coacting wire bending elements in each unit coupled with the second mentioned shaft with one of said elements in each unit being operable in timed relation with the corresponding element in the other unit to sweep a wire out of the magazine and bend opposite ends thereof against the other bending element.

References Cited in the file of this patent

UNITED STATES PATENTS

| | | |
|---|---|---|
| 592,727 | Frantz | Oct. 26, 1897 |
| 882,060 | Glenn | Mar. 17, 1908 |
| 956,006 | Wagniere | Apr. 26, 1910 |
| 1,001,198 | Haas | Aug. 22, 1911 |
| 1,004,998 | Crecelius | Oct. 3, 1911 |
| 1,070,696 | Kempster | Aug. 19, 1913 |
| 1,488,996 | McDonnell | Apr. 1, 1924 |
| 1,616,452 | Knable | Feb. 8, 1927 |
| 1,616,453 | Knable | Feb. 8, 1927 |
| 1,873,649 | Knott | Aug. 23, 1932 |
| 2,059,771 | Boles | Nov. 3, 1936 |
| 2,081,167 | Brownstien | May 27, 1937 |
| 2,101,860 | Lewis | Dec. 14, 1937 |
| 2,122,082 | Bertram | June 28, 1938 |
| 2,145,810 | Backer | Jan. 31, 1939 |